United States Patent
Liao et al.

(10) Patent No.: US 8,201,416 B2
(45) Date of Patent: *Jun. 19, 2012

(54) METHOD AND SYSTEM OF TEMPERATURE-CONTROL FOR ELECTRONIC COMPONENT

(75) Inventors: Tse-Hsine Liao, Hsin-Tien (TW); Ting-Kuo Kao, Hsin-Tien (TW)

(73) Assignee: Giga-Byte Technology Co., Ltd., Taipei County (TW)

( * ) Notice: Subject to any disclaimer, the term of this patent is extended or adjusted under 35 U.S.C. 154(b) by 95 days.

This patent is subject to a terminal disclaimer.

(21) Appl. No.: 12/786,038

(22) Filed: May 24, 2010

(65) Prior Publication Data

US 2010/0235014 A1    Sep. 16, 2010

Related U.S. Application Data (63) Continuation of application No. 11/609,239, filed on Dec. 11, 2006, now Pat. No. 7,836,717.

(30) Foreign Application Priority Data

Jun. 9, 2006    (TW) ............................ 95120718 A (51) Int. Cl.
- *F25D 23/12* (2006.01)
- *F28D 15/00* (2006.01)
- *H05K 7/20* (2006.01)

(52) U.S. Cl. .................. 62/259.2; 165/104.33; 361/699

(58) Field of Classification Search .................. 62/259.2; 236/49.3, 94, 1 C; 165/104.33, 80.4; 361/699, 361/690, 698, 688, 697
See application file for complete search history.

(56) References Cited

U.S. PATENT DOCUMENTS

| 6,880,345 | B1 | 4/2005 | Leiji et al. | |
| 7,401,644 | B2 * | 7/2008 | Ziarnik et al. | 165/287 |
| 7,836,717 | B2 * | 11/2010 | Liao et al. | 62/259.2 |
| 2005/0114068 | A1 | 5/2005 | Chey et al. | |
| 2006/0161375 | A1 * | 7/2006 | Duberstein et al. | 702/132 |

FOREIGN PATENT DOCUMENTS

| JP | 11296488 A | * | 10/1999 |
| JP | 2000180267 A | * | 6/2000 |
| JP | 04-33500420 | | 11/2004 |
| JP | 2004335004 A | * | 11/2004 |

* cited by examiner

*Primary Examiner* — Chen-Wen Jiang
(74) *Attorney, Agent, or Firm* — Chun-Ming Shih (57) ABSTRACT

A method and a system of temperature-control for an electronic component are provided, in which a plurality of temperature sensors is disposed in each area of the electronic component. The temperature-control method includes obtaining a plurality of sensed temperature values; looking up a temperature-control table recording the relationship between a temperature-control threshold and a temperature-control operation set for each area; selecting the temperature-control operation corresponding to sensed temperature values greater than the temperature-control thresholds depending on the temperature-control table; and starting the temperature-control operation to make the sensed temperature values being lower than or equal to the temperature-control thresholds.

11 Claims, 5 Drawing Sheets

METHOD AND SYSTEM OF TEMPERATURE-CONTROL FOR ELECTRONIC COMPONENT

CROSS-REFERENCE TO RELATED APPLICATIONS

This application is a continuation of U.S. patent application Ser. No. 11/609,239 filed Dec. 11, 2006 which claimed priority under 35 U.S.C. §119(a) to Patent Application No(s). 095120718 filed in Taiwan, R.O.C. on Jun. 9, 2006, the entire contents of which are hereby incorporated by reference.

BACKGROUND OF THE INVENTION

1. Field of Invention

The present invention relates to a method and a system of temperature-control, and more particularly, to a method and a system of temperature-control for an electronic component.

2. Related Art

In recent years, along with the increasing improvement of design and fabricating technique of integrated circuits, operation speed and processing performance of chips of the computer component increasingly progress. However, generally speaking, the faster the operation speed of the electronic chips is, the higher the processing performance is, and more heats the electronic chips generate. However, the high-temperature operating environment is an important factor affecting the service life of the electronic chips. Therefore, it is an important subject in the design of the computer system how to effectively provide a good heat dissipation environment.

The computer mainboard is a product of a combination of a printed circuit board and electronic parts of various circuit characteristics. Sometimes, errors in the manufacturing process may cause an unbalance of the current in the circuit, thus further resulting in a high temperature in partial areas of the electronic parts or the computer mainboard. However, currently, most of the commonly used cooling mechanisms, e.g., heat-dissipating fan, cannot adjust the rotation speed of the fan in accordance with the actual temperature. Although some designs can adjust the rotation speed of the fan in accordance with the actual environment, the problem that the temperature rises due to the unbalanced current of the circuit cannot be solved, finally resulting in the burn-out of the electronic parts such as chip sets and processors.

In addition, as the operation speed of the computer gradually progresses, it is necessary to improve the rotation speed of the fan to maintain the temperature of the operation environment for the electronic chip. However, in many cases such as browsing the Internet and word processing, the computer system is not required to operate in a full-speed operation mode. Therefore, most of the computer users always suffer the unnecessary fan noises, excessive heats, and power consumption.

Furthermore, when the electronic components in operation generate heats, only partial areas have high temperature, or some elements in the peripheral areas relatively have high temperature. If only one heatsink is used to dissipate heats from the whole electronic component, it is uneconomical in terms of efficiency and energy consumption.

Therefore, it is a problem to be solved for the researchers how to provide a more precise temperature-control method and system for an electronic component, so as to control temperature and cooling in accordance with the actually sensed temperature in each area of the electronic component, thereby avoiding unnecessary fan noises, excessive heats, and power consumption.

SUMMARY OF THE INVENTION

In view of the above problems, the main objective of the present invention is to provide a method and system of temperature-control for an electronic component, so as to control temperature and cooling in accordance with the actually sensed temperature in each area of the electronic component" thereby controlling the temperature of the electronic component within a range for safe operation.

Therefore, in order to achieve the above objective, the present invention provides a method of temperature-control for an electronic component, wherein a plurality of temperature sensors is disposed in each area of the electronic component. The temperature-control method comprises obtaining a plurality of sensed temperature values in each area; then looking up a temperature-control table recording the relationship between a temperature-control threshold and a temperature-control operation (e.g., a first fan control, a second fan control, an operating performance control of the central processing unit (CPU), a third fan control, a fourth fan control, and an output current balance control of a power supply) set for each area; thereafter selecting the temperature-control operation corresponding to the sensed temperature values greater than the temperature-control thresholds depending on the temperature-control table; and starting the temperature-control operation to make the sensed temperature values being lower than or equal to the temperature-control thresholds set for each area.

That is, the present invention provides a temperature-control method for immediately performing temperature-control operations on areas with a temperature exceeding the temperature thresholds according to the actually sensed temperature of each area of the electronic component of the computer mainboard. The temperature-control method obtains the relevant control information by looking up the temperature-control table, and then performs corresponding temperature control operations, so as to control the temperature of the electronic component is within a range of safe operation.

In addition, in order to achieve the above objective, the method of temperature-control for an electronic component provided by the present invention comprises a plurality of temperature sensors disposed in each area of the electronic component and comprises the following steps. First, a plurality of sensed temperature values of each area is obtained. When one of the sensed temperature values of each area is greater than a temperature-control threshold, a first-stage temperature-control operation (e.g., a first fan control, a second fan control, a third fan control, and a fourth fan control) is started. When the sensed temperature values of adjacent areas are different, a second-stage temperature-control operation (e.g., the output current balance control of the power supply) is started. And when one of the sensed temperature values of each area is still greater than a temperature-control threshold, a third-stage temperature-control operation (e.g., the operating performance control of the CPU) is started to make the sensed temperature values being lower than or equal to the temperature-control threshold.

Furthermore, in order to achieve the above objective, the system of temperature-control for an electronic component provided by the present invention comprises a plurality of temperature sensors disposed in each area of the electronic component, for obtaining sensed temperature values of the electronic component; a temperature-control table, recording the relationship between the temperature-control threshold and the temperature-control operation set for each area; a temperature-analysis module, selecting the temperature-control operation corresponding to the sensed temperature values greater than the temperature-control thresholds depending on the temperature-control table; and a temperature-control processing module, starting the selected temperature-control operations to make the sensed temperature values being lower than or equal to the temperature-control thresholds.

Furthermore, in order to achieve the above objective, the system of temperature-control for an electronic component provided by the present invention comprises a plurality of temperature sensors disposed in each area of the electronic component, for obtaining the sensed temperature values of the electronic component; a temperature analysis module, for analyzing to obtain the sensed temperature values and then generate an analysis result; a first temperature-control processing module, starting the first-stage temperature-control operation when the analysis result shows that one of the sensed temperature values of each area is greater than the temperature-control threshold; a second temperature-control processing module, starting the second-stage temperature-control operation when the sensed temperature values of adjacent areas are different; and a third temperature-control processing module, starting the third-stage temperature-control operation when the analysis result shows that one of the sensed temperature values of each area is still greater than the temperature-control threshold.

With this method and system of temperature-control for an electronic component, various cooling mechanisms can be preferably used for temperature control according to the actual operation temperature of the electronic component, so as to assure the temperature of the electronic component to be kept within a range of safe operation. In another aspect, the cooling mechanism (e.g., heat-dissipating fan) does not work in a full-speed operation mode, thereby avoiding the unnecessary fan noises.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1:
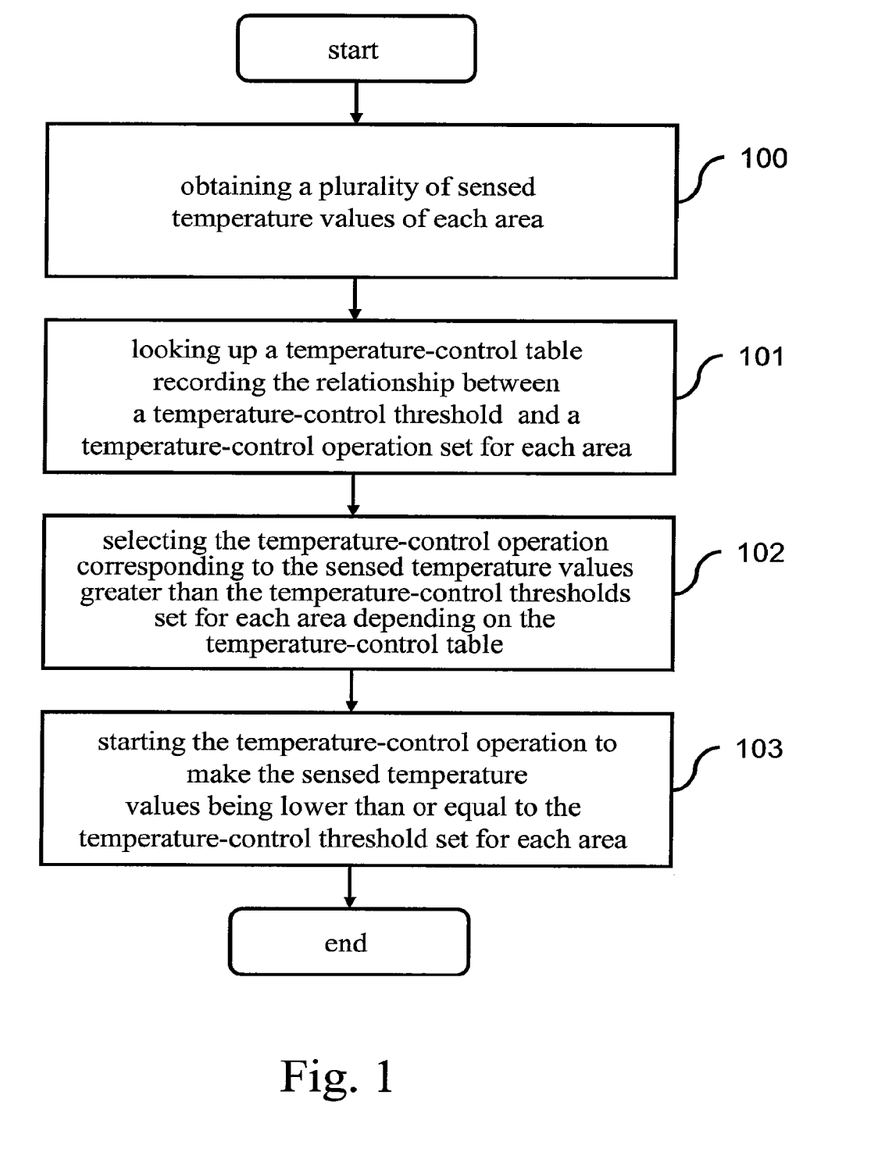
FIG. 1 is a flow chart of steps of a temperature-control method according to a first embodiment of the present invention.
Figure 2:
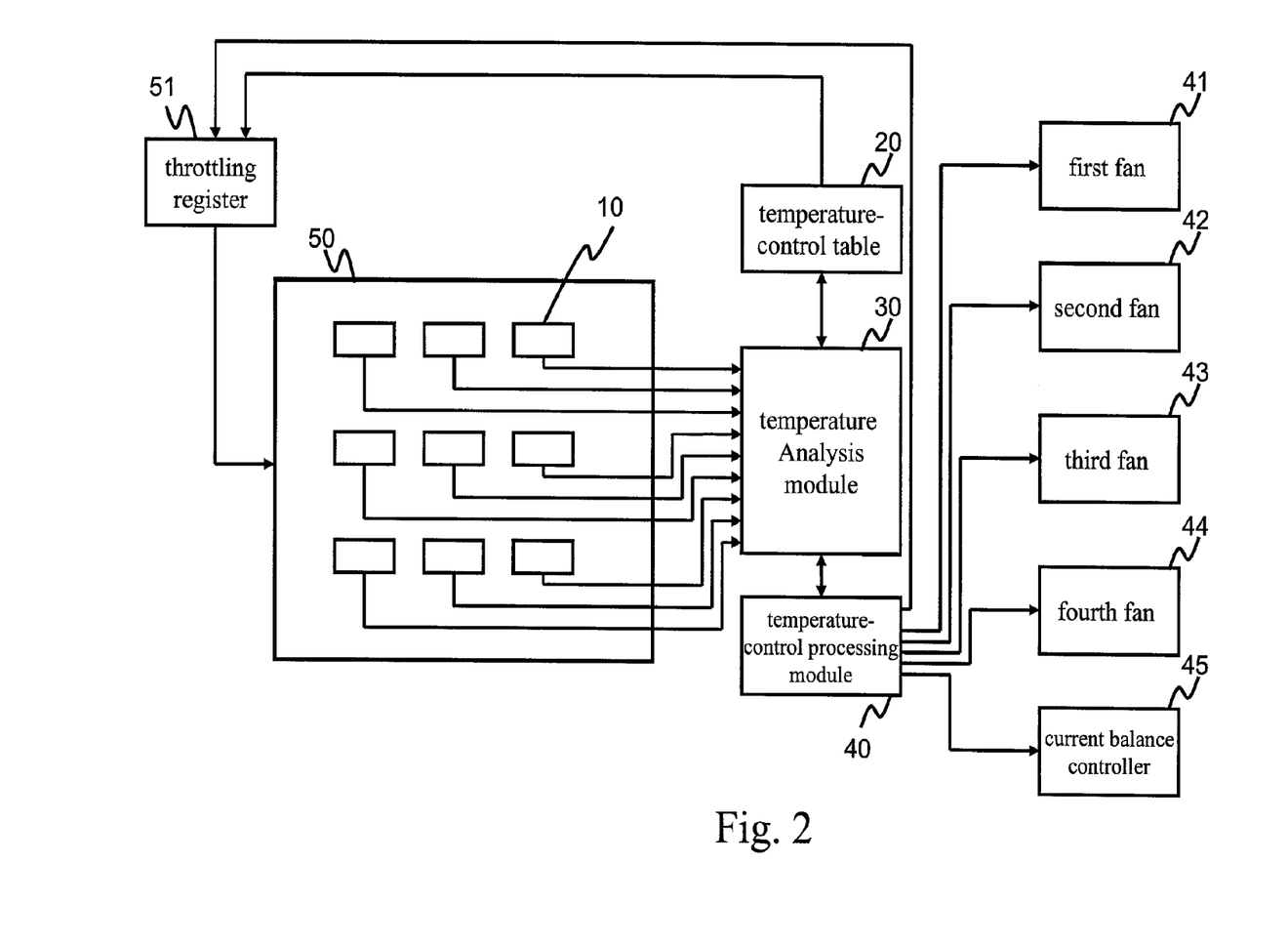
FIG. 2 is a block diagram of a system of temperature-control for an electronic component according to the first embodiment of the present invention.

Please refer to FIG. 1 of a flow chart of steps of a temperature-control method according to a first embodiment of the present invention. A plurality of temperature sensors is disposed in each area of electronic component (e.g., chip set, power transistor, CPU, graphics processor, or memory) of the computer mainboard. The temperature-control method is first to obtain a plurality of sensed temperature values of each area by the temperature sensors 10 (as shown in FIG. 2) (Step 100), wherein the sensed temperature values are obtained by sampling in a predetermined time period (e.g., 5 seconds or 20 seconds). Then, look up a temperature-control table for the sensed temperature values, wherein the relationship between a temperature-control threshold and a temperature-control operation set for each area is recorded in the temperature-control table (Step 101), and the temperature-control table is preset in the storage device of the computer system, or stored in the data of the basic input/output system (BIOS).

Thereafter, depending on the temperature-control table, the temperature-control operation corresponding to the sensed temperature values greater than the temperature-control thresholds set for each area is selected (Step 102). Thus, the temperature-control operation can be an accumulated type or a single type and comprises a first fan control, a second fan control, an operating performance control of a CPU, a third fan control, a fourth fan control, and an output current balance control of a power supply. The above first to fourth fans are disposed in each area of the electronic component for dissipating the heats from the heat-generating area, and the number of the disposed fans is not limited to the above description. Finally, the selected temperature-control operation is started to make the sensed temperature values being lower than or equal to the temperature-control thresholds set for each area (Step 103).

Furthermore, the first embodiment of the present invention is integrated in a computer application program. The user is capable of manually or automatically set the temperature threshold of each area of a CPU through icon or other similar selection interface.

Please refer to FIG. 2 of a block diagram of a system according to the first embodiment of the present invention. The system comprises temperature sensors 10, a temperature-control table 20, a temperature analysis module 30, and a temperature-control processing module 40.

Figure 4:
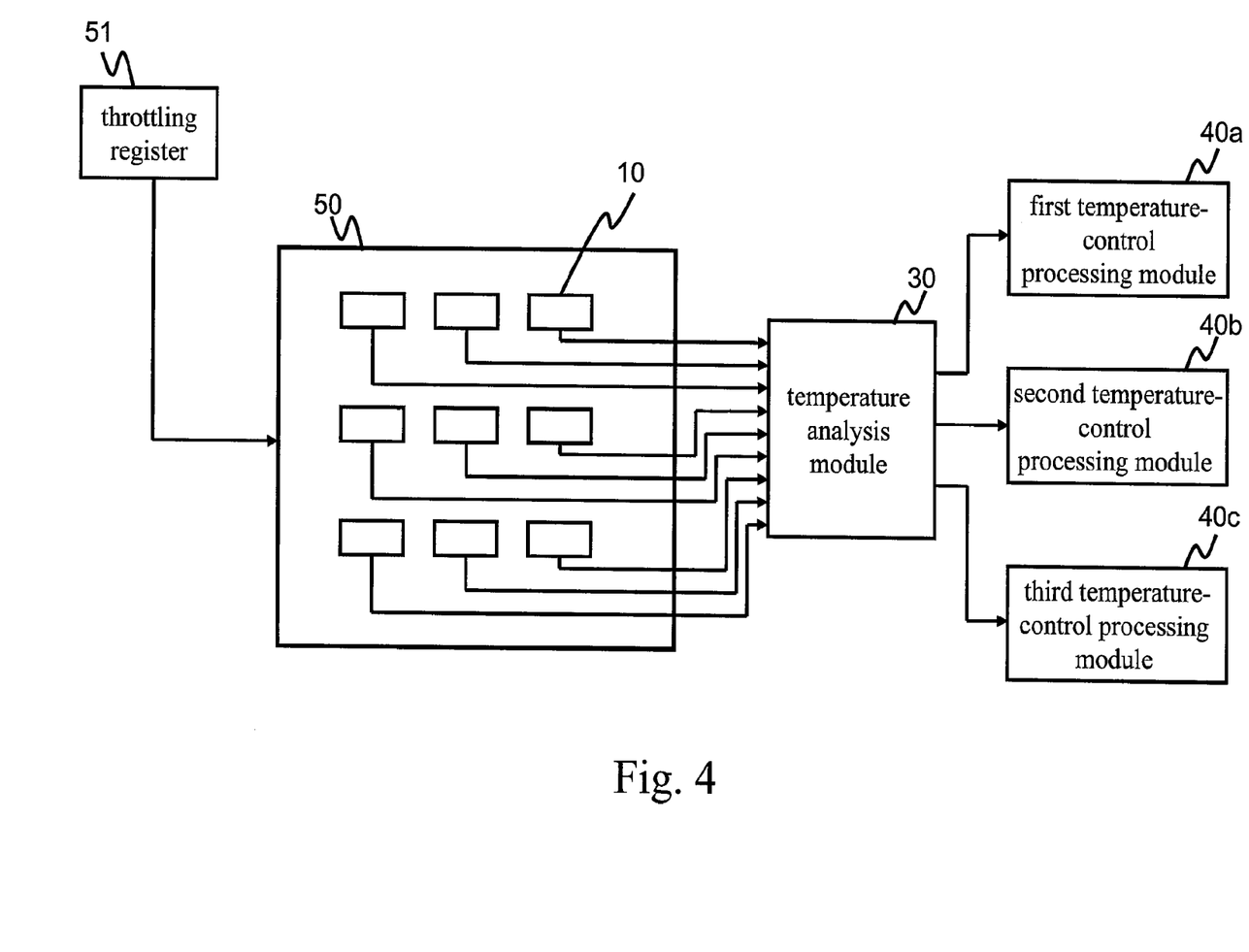
FIG. 4 is a block diagram of a system of temperature-control for an electronic component according to the second embodiment of the present invention.

The temperature sensors 10 are disposed in each area of electronic component of the computer mainboard, for obtaining the actually sensed temperature values of each area of the electronic component of the computer mainboard, in which the electronic component comprises a chip set (e.g., south bridge or north bridge), a power transistor, a CPU, a graphics processor, and a memory (for example, CPU 50 in this embodiment). In practice, the temperature sensors 10 can be thermal couple sensors, thermal resistors, or IR sensors. Furthermore, for the convenience of illustration, nine temperature sensors 10 are shown in FIG. 2 and FIG. 4, which is not intended to limit the number of the temperature sensors 10.

The temperature-control table 20 records the relationship between the temperature-control threshold and the temperature-control operation set for each area. The temperature-control table 20 can be preset in the storage device of the computer system, or stored in the data of the BIOS, which is shown in the table below.

| Temperature threshold | Temperature-control operation | | | | | |
|---|---|---|---|---|---|---|
| | Operation 1 | Operation 2 | Operation 3 | Operation 4 | ... | Operation 32 |
| First temperature threshold | ◉ | ◉ | ◉ | ◉ | ... | ◉ |
| Second temperature threshold | — | ◉ | ◉ | ◉ | ... | ◉ |
| Third temperature threshold | ◉ | — | ◉ | — | ... | — |
| Fourth temperature threshold | — | — | — | ◉ | ... | ◉ |
| Fifth temperature threshold | ◉ | — | — | ◉ | ... | ◉ |

Remarks:
◉ indicates an enable option;
— indicates a disable option

Five temperature thresholds are listed in the above table for illustration, and the temperature-control operation has 32 variations in total. For example, Operation 1 is a first fan control, Operation 2 is a current balance control, Operation 3 is a operating performance control, Operation 4 is a first fan control and a current balance control, Operation 5 is a second fan control, Operation 6 is a third fan control, Operation 7 is a second fan control and a current balance control . . . , and so forth. Therefore, when the sensed temperature values exceed the first temperature threshold, the third temperature threshold, and the fifth temperature threshold, the temperature-control operation of Operation 1 is started. When the sensed temperature values exceeds the first temperature threshold and the second temperature threshold, the temperature-control operation of Operation 2 is started . . . , and so forth.

The temperature analysis module 30 is connected to the temperature sensors 10 and the temperature-control table 20 respectively, and is used to select the temperature-control operation corresponding to the sensed temperature values greater than the temperature-control thresholds set for each area depending on the temperature-control table 20, and then output the selected temperature-control operation to the temperature-control processing module 40 for processing, thereby performing the relevant temperature-control operation.

The temperature-control processing module 40 is connected to the temperature analysis module 30, and is used to start the temperature-control operation selected by the temperature analysis module 30 so as to make the sensed temperature values being lower than or equal to the temperature-control thresholds. The temperature-control operation comprises a first fan 41 control, a second fan 42 control, an operating performance control of a CPU (achieved by the throttling register 51), a third fan 43 control, a fourth fan 44 control, and an output current balance control of a power supply (achieved by the current balance controller 46). The above operating performance control of a CPU is expressed by a percentage of a full-speed performance, for example, 100%, 90%, 85%, 75%, 65%, 50%, 45%, 35% of a full-speed operation.

The CPU 50, the core module of a computer mainboard, is connected to the temperature sensors 10 and the throttling register 51, and is used to process signals between various modules.

The throttling register 51 is connected to the CPU 50, the graphics processor 60, the temperature-control table 20, and the temperature-control processing module 40 respectively for controlling the working performance of the CPU 50.

In addition, the fan control circuit for the first fan 41, the second fan 42, the third fan 43 and the fourth fan 44 can be achieved by a pulse width modulate (PWM) circuit or voltage control circuit in practice. The operation of the fan can be a multi-stage rotation speed control or non-stage rotation speed control.

Figure 3:
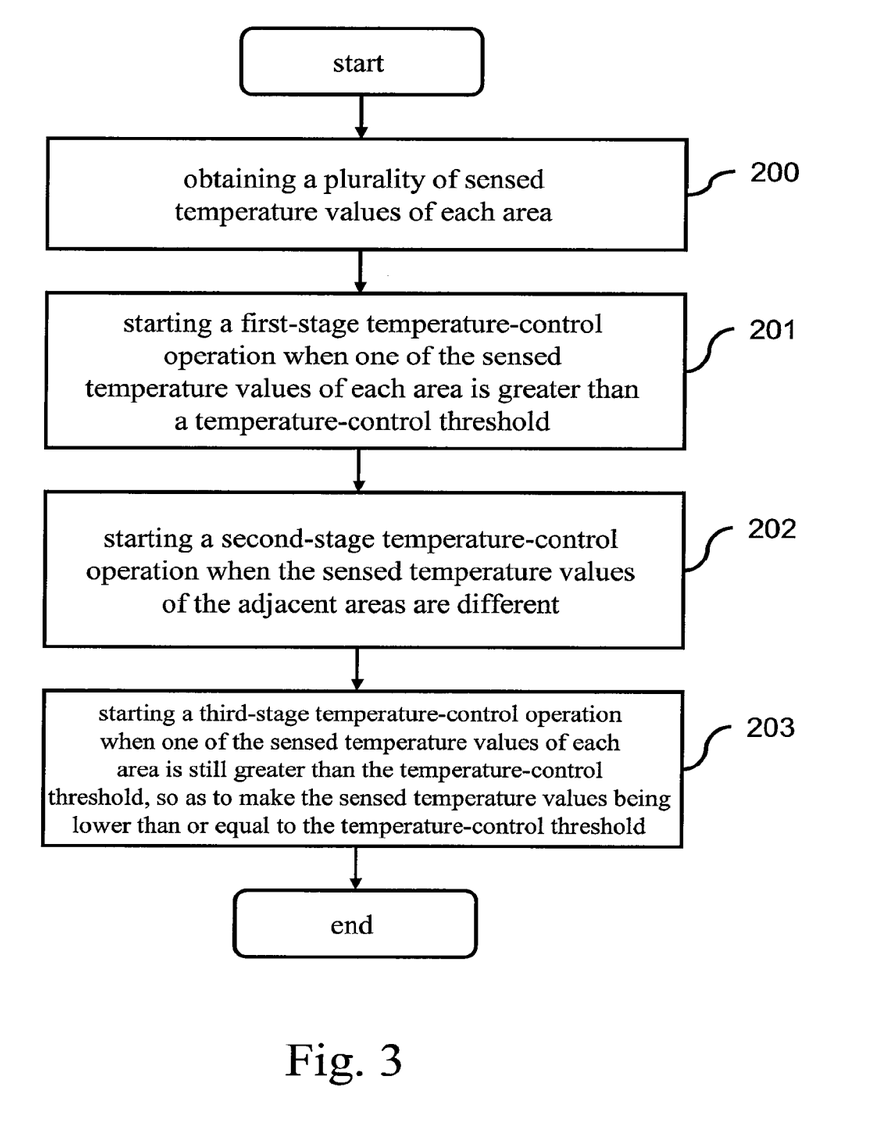
FIG. 3 is a flow chart of steps of a method of temperature-control for an electronic component according to a second embodiment of the present invention.

Please refer to FIG. 3 of a flow chart of steps of a temperature-control method according to a second embodiment of the present invention. A plurality of temperature sensors is disposed in each area of the electronic component (e.g., chip set, power transistor, CPU, graphics processor, memory, and the like) of the computer mainboard. The temperature-control method is first to obtain a plurality of sensed temperature values of each area by the temperature sensors 10 (as shown in FIG. 4) (Step 200), wherein the sensed temperature values are obtained by sampling in a predetermined time period (e.g., 5 seconds or 20 seconds). Then, the relationship between the sensed temperature values and the temperature-control threshold is analyzed, and a first-stage temperature-control operation is started when one of the sensed temperature values of each area is greater than the temperature-control threshold (Step 201), wherein the first-stage temperature-control operation comprises a fan control of the chip set, fan control of the CPU, fan control of the graphics processor, and fan control of the mainframe.

Then, the relationship between the sensed temperature values and the temperature-control threshold are analyzed. When the sensed temperature values obtained from adjacent areas are different, the second-stage temperature-control operation is started (Step 202), wherein the second-stage temperature-control operation is the output current balance control for a power supply (achieved by a current balance controller 46).

Finally, the relationship between the sensed temperature values and the temperature-control threshold is analyzed again. When one of the sensed temperature values of each area is still greater than the temperature-control threshold, a third-stage temperature-control operation is started to make the sensed temperature values being lower than or equal to the temperature-control threshold (Step 203), wherein the third-stage temperature-control operation comprises an operating performance control for a CPU and an operating performance control for a graphics processor.

Please refer to FIG. 4 of a block diagram of a system according to a second embodiment of the present invention. Different from the first embodiment, a temperature-control table 20 is omitted in the second embodiment. A part of modules, including the temperature sensors 10, the temperature analysis module 30, the first temperature-control processing module 40a, the second temperature-control processing module 40b, and the third temperature-control processing module 40c are the same as those of the first embodiment, and the details will not be illustrated herein again.

The temperature analysis module 30 is connected to the temperature sensors 10, for analyzing the relationship between the temperature values of the adjacent areas sensed by the temperature sensors 10 and the relationship between the temperature threshold and the sensed temperature values of each area. Then an analysis result is generated and output to the corresponding temperature-control processing module, wherein the temperature thresholds are stored in the storage device of the computer system or stored in the data of the BIOS in a manner of user setting or preset value.

The first temperature-control processing module 40a is connected to the temperature analysis module 30. When the analysis result shows that one of the sensed temperature values of each area is greater than the temperature-control threshold, the first-stage temperature-control operation is started, and the operation comprises a first fan control, a second fan control, a third fan control, and a fourth fan control.

The second temperature-control processing module 40b is connected to the temperature analysis module 30. When the analysis result shows that the sensed temperature values of the adjacent areas are different, the second-stage temperature-control operation is started, and the second-stage temperature-control operation is the output current balance control for a power supply (achieved by the current balance controller 46).

The third temperature-control processing module 40c is connected to the temperature analysis module 30. When the analysis result shows that one of the sensed temperature values of each area is still greater than the temperature-control threshold, the third-stage temperature-control operation is started, and the third-stage temperature-control operation is the operating performance control for a CPU.

By the use of the method and system of temperature-control for an electronic component, various cooling mechanisms in the computer mainboard perform a good temperature control to the electronic component of the computer mainboard according to the current actual operation temperature, thereby assuring the temperature of the electronic component within the range of safe operation. In another aspect, the cooling mechanism (e.g., heat-dissipating fan) generally does not work in full load, thereby avoiding the unnecessary fan noises.

Figure 5:
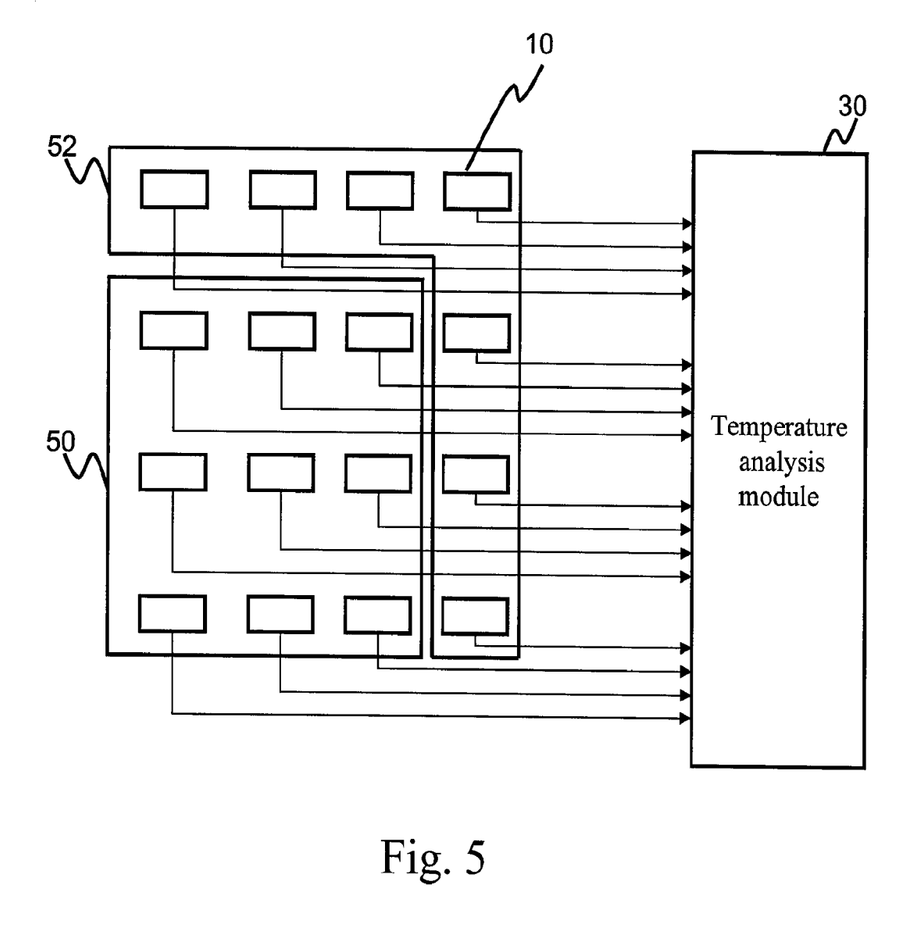
FIG. 5 is a schematic view of temperature-sensing areas of the electronic component according to an embodiment of the present invention.

In addition, when all the electronic component and the peripheral elements are heat sources, and the operation thereof are related to each other, the sensing area can be expanded, so as to perform the temperature control on all the electronic component and the peripheral elements. As shown in FIG. 5 (only showing the alignment of the temperature sensors 10), all the power elements 52 adjacent to the CPU 50 are heat sources, and the operations thereof are related to each other. At this time, the sensing area is expanded to cover the CPU 50 and the power elements 52, thereby performing the temperature control on the CPU 50 and the power elements 52 together.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of temperature-control for an electronic component the method comprising:
    obtaining a plurality of sensed temperature values by a plurality of temperature sensors which are disposed on the electronic component, wherein each of the temperature sensors has one corresponding temperature-control threshold and the temperature-control thresholds are constants;
    comparing each of the sensed temperature values with a corresponding one of the temperature-control thresholds;
    looking up a temperature-control table according to at least one of the temperature-control thresholds which is less than the corresponding sensed temperature value, wherein the temperature-control table records a relationship between the temperature-control thresholds and a plurality of temperature-control operations;
    selecting one of the temperature-control operations by looking up the temperature-control table; and
    starting the temperature-control operation to make each of the sensed temperature values be lower than or equal to the corresponding one of the temperature-control thresholds.

2. The method of temperature-control for an electronic component according to claim 1, wherein the temperature-control operation is one selected from a group consisting of a first fan control, a second fan control, an operating performance control of a central processing unit (CPU), a third fan control, a fourth fan control, and an output current balance control of a power supply.

3. The method of temperature-control for an electronic component according to claim 2, wherein the operating performance control of the CPU is achieved by throttling control of the CPU.

4. The method of temperature-control for an electronic component according to claim 1, wherein the method is integrated into a computer program.

5. The method of temperature-control for an electronic component according to claim 4, wherein the computer program is stored within a computer hard disk.

6. The method of temperature-control for an electronic component according to claim 4, wherein a user interface of the computer program is an icon selection interface.

7. A system of temperature-control for an electronic component, the system comprising:
    a plurality of temperature sensors disposed on an electronic component for obtaining sensed temperature values of the electronic component, wherein each of the temperature sensors has one corresponding temperature-control threshold;
    a temperature-control table for recording a relationship between the temperature-control thresholds and a plurality of temperature-control operations;
    a temperature analysis module for comparing each of the sensed temperature values with a corresponding one of the temperature-control thresholds and selecting one of the temperature-control operations by looking up the temperature-control table according to at least one of the temperature-control thresholds which is less than the corresponding sensed temperature value; and a temperature-control processing module for starting the selected temperature-control operation to make the sensed temperature values being lower than or equal to the temperature-control thresholds.

8. The system of temperature-control for an electronic component as claimed in claim 7, wherein the temperature sensors are selected from a group consisting of thermal couple sensors, thermal resistors, and IR sensors.

9. The system of temperature-control for an electronic component as claimed in claim 7, wherein the temperature-control operation is one selected from a group consisting of a first fan control, a second fan control, an operating performance control of a CPU, a third fan control, a fourth fan control, and an output current balance control of a power supply.

10. The system of temperature-control for an electronic component as claimed in claim 9, wherein the operating performance control of the CPU is achieved by the throttling control of the CPU.

11. The system of temperature-control for an electronic component as claimed in claim 9, wherein when the sensed temperature values of the same area are different, the output current balance control of the power supply is performed.

* * * * *